(12) United States Patent
Inaba

(10) Patent No.: US 9,781,314 B2
(45) Date of Patent: Oct. 3, 2017

(54) DIGITAL CAMERA

(71) Applicant: Minoru Inaba, Oyama (JP)

(72) Inventor: Minoru Inaba, Oyama (JP)

( * ) Notice: Subject to any disclaimer, the term of this patent is extended or adjusted under 35 U.S.C. 154(b) by 0 days.

(21) Appl. No.: 15/039,459

(22) PCT Filed: Nov. 25, 2014

(86) PCT No.: PCT/JP2014/081024
§ 371 (c)(1),
(2) Date: May 26, 2016

(87) PCT Pub. No.: WO2015/080070
PCT Pub. Date: Jun. 4, 2015

(65) Prior Publication Data
US 2017/0006194 A1    Jan. 5, 2017

(30) Foreign Application Priority Data

Nov. 28, 2013 (JP) .................... 2013-246731

(51) Int. Cl.
H04N 5/225 (2006.01)
F16C 11/04 (2006.01)
H04N 5/232 (2006.01)

(52) U.S. Cl.
CPC ........... H04N 5/2252 (2013.01); F16C 11/04 (2013.01); H04N 5/23293 (2013.01)

(58) Field of Classification Search
CPC .............................................. H04N 5/23293
See application file for complete search history.

(56) References Cited

U.S. PATENT DOCUMENTS 7,898,594 B2    3/2011 Inaba .................. 348/373
2005/0046726 A1  3/2005 Hojo et al. ........... 348/333.06
(Continued)

FOREIGN PATENT DOCUMENTS

JP    2001-065540    3/2001
JP    2002-051244    2/2002
(Continued)

Primary Examiner — Twyler Haskins
Assistant Examiner — Dwight C Tejano
(74) Attorney, Agent, or Firm — Fattibene and Fattibene LLC; Paul A. Fattibene

(57) ABSTRACT

[Problem] To provide a digital camera that enables, using a simple configuration, a digital display to be easily and freely rotated in the horizontal and vertical directions. [Solution] A digital camera (1) is provided with the following: a camera main body (2) having an image pickup lens; a liquid crystal display (3) that displays the images picked up by the image pickup lens; and a hinge unit (4) that connects the camera main body (2) and the electronic display (3). The camera main body (2) includes a first slit (22) that is formed by cutting out at least a portion of an inner circumferential wall (21*a*) of an accommodating depression (21) which accommodates the hinge unit (4), and that causes an outer circumferential surface (4*a*) of the hinge unit (4) to be exposed to the outside. The hinge unit (4) includes a second slit (43) that is formed by calling out at least a portion or an outer circumferential wall (42) which surrounds the outer circumference of the liquid crystal display (3), and that causes an outer circumferential surface (3*b*) of the liquid crystal display (3) to be exposed to the outside.

10 Claims, 9 Drawing Sheets

(56) References Cited

U.S. PATENT DOCUMENTS

| | | | | |
|---|---|---|---|---|
| 2012/0081593 | A1* | 4/2012 | Nakagawa | G03B 13/04 348/333.06 |
| 2012/0113308 | A1* | 5/2012 | Ishikawa | H04N 5/2251 348/333.06 |
| 2013/0093946 | A1* | 4/2013 | Nakagawa | H04N 5/2252 348/374 |
| 2014/0253777 | A1* | 9/2014 | Yamaura | H04N 5/2252 348/333.06 |
| 2015/0002721 | A1* | 1/2015 | Ujiie | G03B 17/04 348/333.06 |
| 2015/0172553 | A1* | 6/2015 | Nonaka | G03B 17/04 348/333.06 |
| 2015/0334273 | A1* | 11/2015 | Yanagisawa | H04N 5/2251 348/373 |
| 2015/0358512 | A1* | 12/2015 | Mitsui | G03B 17/04 348/333.06 |

FOREIGN PATENT DOCUMENTS

| | | |
|---|---|---|
| JP | 2005-079732 | 3/2005 |
| JP | 5296270 | 9/2013 |
| JP | 2014-18767 | 10/2014 |

\* cited by examiner

DIGITAL CAMERA

TECHNICAL FIELD OF THE INVENTION

The present invention relates to digital cameras and, in particular, provides a digital camera in which an electronic display is rotatable longitudinally and laterally with a single touch when the digital camera is used at a low angle.

BACKGROUND OF THE INVENTION

In conventional digital cameras, by rotating the camera about the optical axis of a taking lens in accordance with the size, orientation, and so forth of a subject, a longitudinal screen position and a lateral screen position can be separately photographed.

However, when the taking lens of the camera is directed to a position almost in a horizontal direction for photographing at an extremely low position, that is, so-called low-angle photographing, a photographer disadvantageously has to lie down to the ground or attach a 90-degree transformation prism or reflecting mirror to a viewfinder.

To address this disadvantage, a digital camera has been known in which the angle of an electronic display is changeable longitudinally and laterally so as to allow the photographer to easily view the electronic display for photographing a longitudinal screen position and a lateral screen position by the digital camera.

A known example of this digital camera includes a main body part having an imaging lens, an electronic display for displaying an image taken by the imaging lens, and a hinge unit coupling the main body part and the electronic display together, wherein the hinge unit includes a first rotation shaft axially attaching the hinge unit to the main body part so that the hinge unit is rotatable at 90 degrees about a first direction and a second rotation shaft axially attaching the electronic display to the hinge unit so that the electronic display is rotatable at 90 degrees about a second direction perpendicular to the first direction, and the digital camera further includes a first quick release mechanism openably and closably coupling the main body part and the hinge unit and a second quick release mechanism openably and closably coupling the hinge unit and the electronic display (refer to Japanese Patent No. 5296270).

SUMMARY OF THE INVENTION

However, in the above-described digital camera, when the first quick release mechanism or the second quick release mechanism is released to open or close the electronic display or the hinge unit, the photographer has to pinch part of the electronic display with fingers from a narrow gap between the electronic display and the hinge unit for rotation or has to pinch part of the hinge unit from a narrow gap between the hinge unit and the main body part for rotation. Therefore, it is disadvantageously difficult for the photographer to rotate the electronic display and the hinge unit.

Moreover, when the first quick release mechanism or the second quick release mechanism is released, the electronic display or the hinge unit may be flipped upward by a spring or the like so as to be easily pinched by the photographer with fingers. However, this disadvantageously makes the digital camera complex and increases the size of the digital camera.

Thus, a technical problem to be solved arises in order to freely rotate the electronic display longitudinally and laterally with ease in a simple structure, and the present invention is to solve this problem.

The present invention is suggested to solve the above-described problem. The invention according to a first aspect provides a digital camera including: a camera main body having an imaging lens, an electronic display for displaying an image taken by the imaging lens, and a hinge unit coupled rotatably about a first rotation shaft to the camera main body and rotatably coupling the electronic display about a second rotation shaft perpendicular to the first rotation shaft, wherein the camera main body includes a first slit formed by cutting out at least a part of inner peripheral walls of an accommodation recessed part provided to be recessed in a front surface of the camera main body to accommodate the hinge unit, the first slit exposing a side surface of the hinge unit to outside, and the hinge unit includes a second slit formed by cutting out at least a part of outer peripheral walls surrounding an outer perimeter of the electronic display, the second slit exposing an outer peripheral surface of the electronic display to outside.

According to this structure, with the side surface of the hinge unit exposed to outside via the first slit, a photographer can easily perform operation of rotating the hinge unit by, for example, holding the hinge unit with fingers, and the electronic display can easily make a transition from the state of being accommodated in the back surface of the camera main body (closed position) to the state of standing on the first rotation shaft substantially perpendicularly to the camera main body (first open position). Also, with the outer peripheral surface of the electronic display exposed to outside via the second slit, the photographer can easily perform operation of rotating the electronic display by, for example, holding the electronic display with fingers, and the electronic display can easily make a transition from a closed position to the state of standing on the second rotation shaft substantially perpendicularly to the camera main body (second open position).

The invention according to a second aspect provides the digital camera in which, in addition to the structure of the digital camera according to the first aspect, the second slit is formed by cutting out at least a part of an outer peripheral wall facing the second rotation shaft among the outer peripheral walls of the hinge unit.

According to this structure, with the second slit provided so as to face the second rotation shaft, the photographer can rotate the electronic display while pressing the outer peripheral surface of the electronic display toward the second rotation shaft. Therefore, the electronic display can be reliably rotated without slipping of a finger which presses the electronic display.

The invention according to a third aspect provides the digital camera in which, in addition to the structure of the digital camera according to the first or second aspect, the first slit is formed by cutting out at least a part of an inner peripheral wall facing the first rotation shaft among the inner peripheral walls of the camera main body.

According to this structure, with the first slit provided so as to face the first rotation shaft, the photographer can rotate the hinge unit while pressing the outer peripheral surface of the hinge unit toward the first rotation shaft. Therefore, the hinge unit can be reliably rotated without slipping of a finger which presses the hinge unit.

The invention according to a fourth aspect provides the digital camera which further includes, in addition to the structure of the digital camera according to any one of the first to third aspects, hinge unit rotation inhibiting means against rotation of the hinge unit at initial rotation when the hinge unit starts rotating about the first rotation shaft.

According to this structure, at initial rotation of the hinge unit, the hinge unit inhibiting mechanism prevents rotation of the hinge unit. Therefore, the hinge unit at the closed position can be inhibited from opening against the photographer's intention. Also, the hinge unit at the first open position can be inhibited from being closed by self weight.

The invention according to a fifth aspect provides the digital camera in which, in addition to the structure of the digital camera according to the fourth aspect, the hinge unit rotation inhibiting means includes a first latch mechanism disposed between the camera main body and the hinge unit to freely engage and disengage the camera main body and the hinge unit.

According to this structure, the first latch mechanism inhibits rotation of the hinge unit unless an external force for relatively rotating the camera main body and the hinge unit acts. Therefore, the hinge unit at the closed position and the first open position can be further inhibited from opening and being closed against the photographer's intention.

The invention according to a sixth aspect provides the digital camera in which, in addition to the structure of the digital camera according to the fourth or fifth aspect, the hinge unit rotation inhibiting means includes a first cam coupled to the first rotation shaft and having a convex cam surface and a first leaf spring which presses the cam surface of the first cam, and includes a first resistance applying mechanism in which, at initial rotation when the hinge unit starts rotating about the first rotation shaft, the first leaf spring applies, to the cam surface of the first cam, a resistance in a direction in reverse to a rotating direction of the hinge unit.

According to this structure, when the hinge unit rotates about the first rotation shaft, the first leaf spring warping in accordance with the rotation of the first cam applies a pressing force for inhibiting rotation of the hinge unit to the first cam at initial rotation of the hinge unit. Therefore, the hinge unit at the closed position and the first open position can be further inhibited from opening and being closed against the photographer's intention.

The invention according to a seventh aspect provides the digital camera which further includes, in addition to the structure of the digital camera according to any one of the first to sixth aspects, display rotation inhibiting means against rotation of the electronic display at initial rotation when the electronic display starts rotating about the second rotation shaft.

According to this structure, at initial rotation of the electronic display, the display rotation inhibiting mechanism inhibits rotation of the electronic display. Therefore, the electronic display at the closed position can be inhibited from opening against the photographer's intention. Also, the electronic display at the second open position can be inhibited from being closed by self weight.

The invention according to an eighth aspect provides the digital camera in which, in addition to the structure of the digital camera according to the seventh aspect, the display rotation inhibiting means includes a second latch mechanism disposed between the electronic display and the hinge unit to freely engage and disengage the electronic display and the hinge unit.

According to this structure, the second latch mechanism inhibits rotation of the electronic display unless an external force for relatively rotating the electronic display and the hinge unit acts. Therefore, the electronic display at the closed position and the second open position can be further inhibited from opening and being closed against the photographer's intention.

The invention according to a ninth aspect provides the digital camera in which, in addition to the structure of the digital camera according to the seventh or eighth aspect, the display rotation inhibiting means includes a second cam coupled to the second rotation shaft and having a convex cam surface and a second leaf spring which presses the cam surface of the second cam, and includes a second resistance applying mechanism in which, at initial rotation when the electronic display starts rotating about the second rotation shaft, the second leaf spring applies, to the cam surface of the second cam, a resistance in a direction in reverse to a rotating direction of the electronic display.

According to this structure, when the electronic display rotates about the second rotation shaft, the second leaf spring warping in accordance with the rotation of the second cam applies a pressing force for inhibiting rotation of the electronic display to the second cam at initial rotation of the electronic display. Therefore, the electronic display at the closed position and the second open position can be further inhibited from opening and being closed against the photographer's intention.

The invention according to a tenth aspect provides the digital camera in which, in addition to the structure of the digital camera according to any one of the first to ninth aspects, the outer peripheral wall of the hinge unit is formed by upwardly folding a peripheral edge of a base of the hinge unit facing a back surface of the electronic display.

According to this structure, with the outer peripheral wall of the hinge unit integrally formed by folding the peripheral edge of the base, stiffness of the hinge unit can be improved.

In the present invention, the electronic display can be freely rotated longitudinally and laterally with ease in a simple structure.

BRIEF DESCRIPTIONS OF THE DRAWINGS

DESCRIPTIONS OF THE PREFERRED EMBODIMENTS

Figure 1:
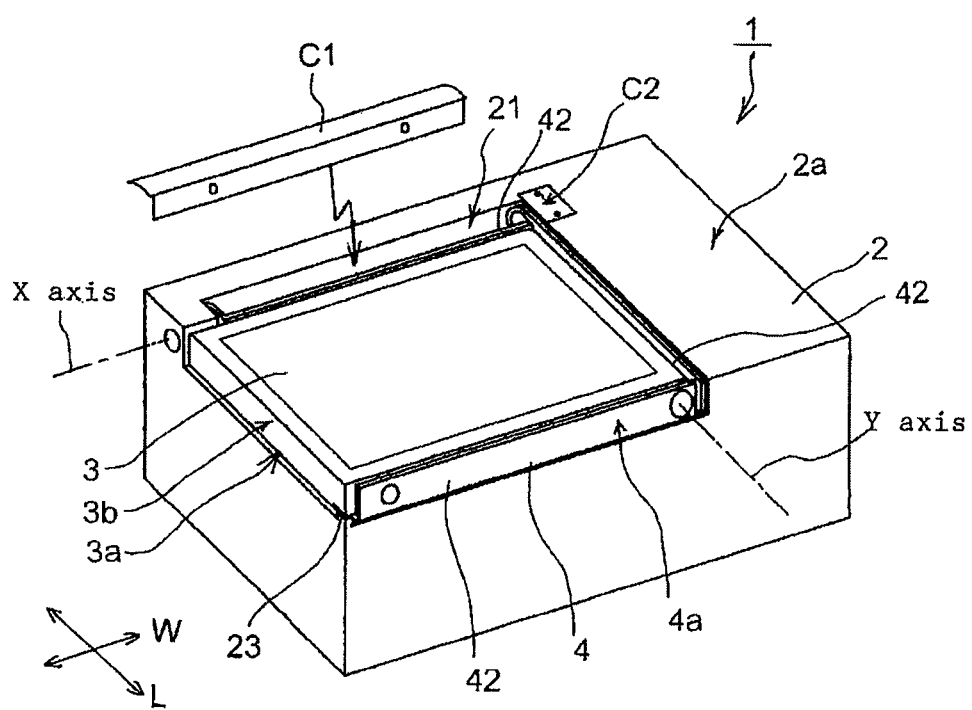
FIG. 1 is a perspective view of a digital camera according to an embodiment of the present invention.

To freely rotate the electronic display longitudinally and laterally with ease in a simple structure, the present invention provides a digital camera including: a camera main body having an imaging lens, an electronic display for displaying an image taken by the imaging lens, and a hinge unit coupled rotatably about a first rotation shaft to the camera main body and rotatably coupling the electronic display about a second rotation shaft perpendicular to the first rotation shaft, wherein the camera main body includes a first slit formed by cutting out at least a part of inner peripheral walls of an accommodation recessed part provided to be recessed in a front surface of the camera main body to accommodate the hinge unit, the first slit exposing a side surface of the hinge unit to outside, and the hinge unit includes a second slit formed by cutting out at least a part of outer peripheral walls surrounding an outer perimeter of the electronic display, the second slit exposing an outer peripheral surface of the electronic display to outside.

Embodiments

In the following, the structure of a digital camera according to an embodiment of the present invention is described based on FIG. 1 to FIG. 5.

A digital camera 1 according to the present embodiment, includes a camera main body 2 having an imaging lens not depicted, a liquid-crystal display 3 as an electronic display for displaying an image taken by the imaging lens, and a hinge unit 4 for coupling the camera main body 2 and the liquid-crystal display 3 together. The electronic display may be an organic EL display.

The hinge unit 4 is supported, with respect to the camera main body 2, so as to be rotatable about an X axis parallel to a camera lateral direction W, and also supports the liquid-crystal display 3 so that the liquid-crystal display 3 is rotatable about a Y axis parallel to a camera longitudinal direction L.

The camera main body 2 includes an accommodation recessed part 21 provided to be recessed a front surface 2a and having a substantially rectangular shape in a planar view to accommodate the liquid-crystal display 3 and the hinge unit 4 and a first slit 22 formed by cutting out a part of inner peripheral walls 21a of the accommodation recessed part 21.

The first slit 22 is formed by cutting out an entire portion of one inner peripheral wall 21a of the accommodation recessed part 21 facing the X axis among the inner peripheral walls 21a of the accommodation recessed part 21 to expose an outer peripheral surface 4a of the hinge unit 4 to outside.

The hinge unit 4 includes a rectangular base 41 facing a back surface 3a of the liquid-crystal display 3, outer peripheral walls 42 provided to each stand from a peripheral edge of the base 41 to surround the outer perimeter of the liquid-crystal display 3, and a second slit 43 formed by cutting out a part of the outer peripheral walls 42.

With the base 41 engaging with an engagement claw 23, the camera main body 2 and the hinge unit 4 are integrally fixed.

By folding the peripheral edge of the base 41 upward, the outer peripheral wall 42 is integrally formed with the base 41. The hinge unit 4 is thin and has light weight, but has high stiffness. To one outer peripheral wall 42, a flange part 44 is connected, which protrudes from the base 41 outward in the camera longitudinal direction L and has a press-fit bearing hole 44a, which will be described further below, formed therein. A gap between the accommodation recessed part 21 and the flange part 44 are covered with a cover C1.

The second slit 43 is formed by cutting out an entire portion of one outer peripheral wall 42 on one side facing the Y axis among the outer peripheral walls 42 on four sides to expose an outer peripheral surface 3b of the liquid-crystal display 3 outside.

A first rotation shaft 5 coupling the camera main body 2 and the hinge unit 4 together is configured of paired lateral-direction shaft parts 51a and 51b respectively disposed at both ends of the hinge unit 4 on the X axis in the camera lateral direction W.

The lateral-direction shaft part 51a has one end press-fitting in the press-fit bearing hole 44a formed in the flange part 44 of the hinge unit 4, a center part axially supported in a loose-fit bearing hole 21b formed in the inner peripheral wall 21a of the camera main body 2, and the other end press-fitting in a press-fit hole 72b of a first cam 72, which will be described further below.

The lateral-direction shaft part 51b has one end press-fitting in the press-fit bearing hole 44a formed in the flange part 44 of the hinge unit 4 and a portion from a center part to the other end axially supported in the loose-fit bearing hole 21b formed in the inner peripheral wall 21a of the camera main body 2.

Thus, the hinge unit 4 is supported to the camera main body 2 so as to be rotatable about the X axis.

Also, a second rotation shaft 6 coupling the liquid-crystal display 3 and the hinge unit 4 together is configured of paired longitudinal-direction shaft parts 61a and 61b respectively disposed at both ends of the liquid-crystal display 3 on the Y axis in the camera longitudinal direction L.

The longitudinal-direction shaft part 61a is provided to protrude from the outer peripheral surface 3b of the liquid-crystal display 3 toward the camera longitudinal direction L, has a center part axially supported in a loose-fit bearing hole 42a formed in the outer peripheral wall 42 of the hinge unit 4, and has a tip press-fitting in a press-fit hole 83b of a second cam 83, which will be described further below.

The longitudinal-direction shaft part 61b is provided to protrude from the outer peripheral surface 3b of the liquid-crystal display 3 toward the camera longitudinal direction L, and is axially supported, from its center to its tip, in the loose-fit bearing hole 42a formed in the outer peripheral wall 42 of the hinge unit 4.

With this, the hinge unit 4 rotatably supports the liquid-crystal display 3 about the Y axis.

Figure 2:
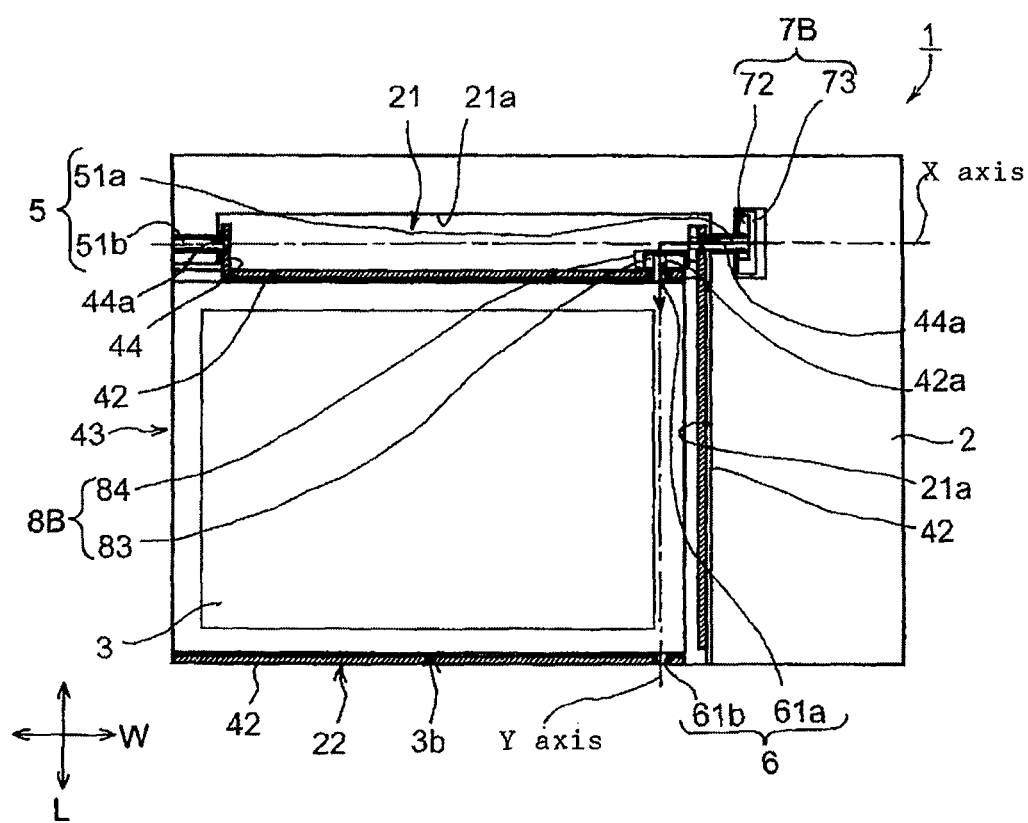
FIG. 2 is a partially-notched plan view of the digital camera depicted in FIG. 1.
Figure 3:
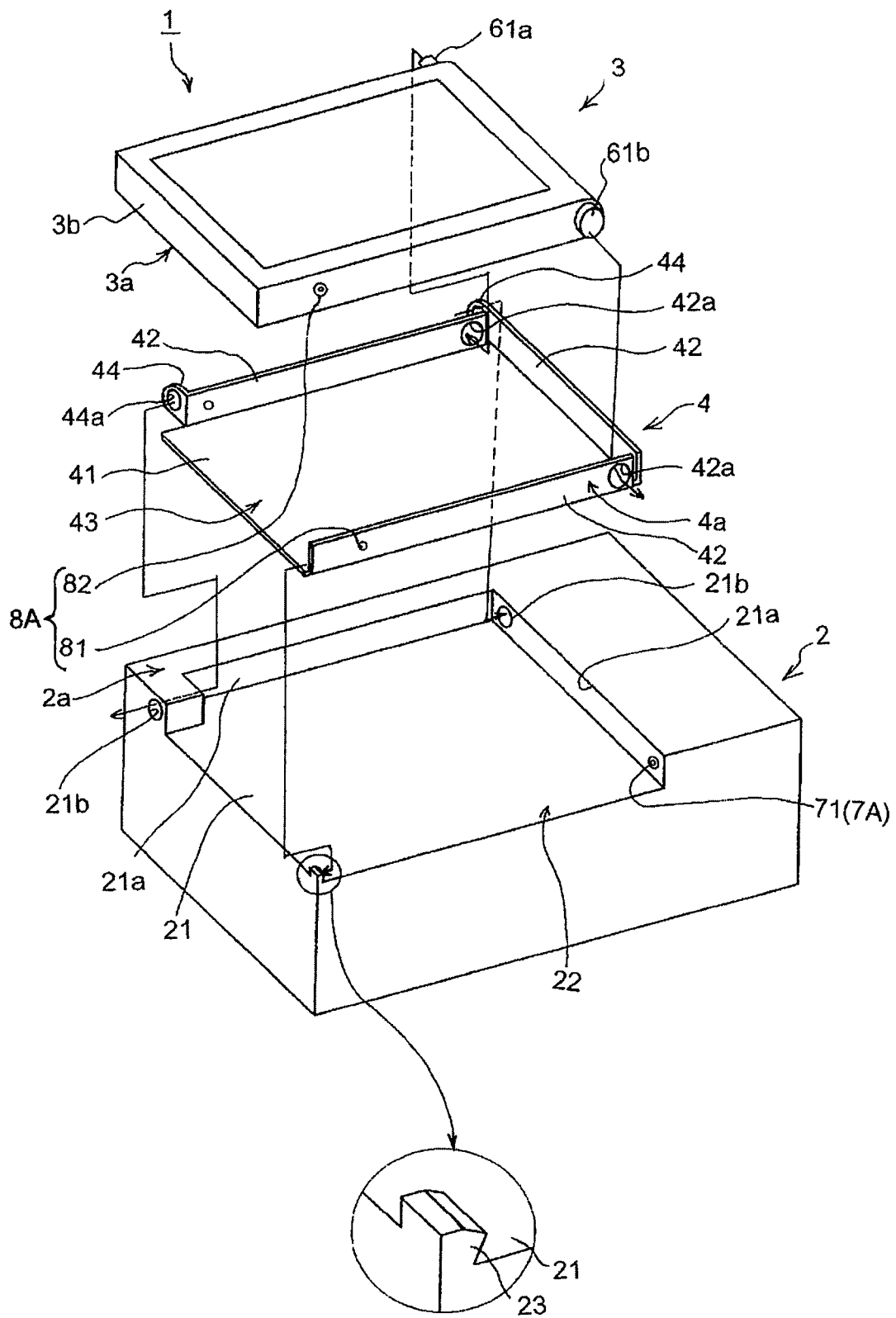
FIG. 3 depicts an exploded view and a partially-enlarged view of a camera main body, an electronic display, and a hinge unit.

Wires connecting the camera main body 2 and the liquid-crystal display 3 together are disposed in the lateral-direction shaft part 51a and the longitudinal-direction shaft part 61a, as indicated by arrows in FIG. 2. Any way of routing the wires can be selected depending on the layout of the first rotation shaft 5, the second rotation shaft 6, and the liquid-crystal display 3.

Hinge unit rotation inhibiting means 7 against initial rotation of the hinge unit 4 when the hinge unit 4 starts rotating about the X axis is provided. The hinge unit rotation inhibiting means 7 includes a first latch mechanism 7A and a first resistance applying mechanism 7B.

The first latch mechanism 7A is disposed between the camera main body 2 and the hinge unit 4. The first latch mechanism 7A includes an engaged blind hole 71 provided to be recessed in the inner peripheral wall 21a of the accommodation recessed part 21 and a hemispherical engaging protrusion, not depicted, provided to protrude from the outer peripheral wall 42 of the hinge unit 4. The first latch mechanism 7A engages the engaging protrusion in the engaged blind hole 71 to freely engage and disengage the camera main body 2 and the hinge unit 4.

While the first latch mechanism 7A is provided to keep the state in which the hinge unit 4 is accommodated in the accommodation recessed part 21 in the present embodiment, the first latch mechanism 7A may be provided as a stopper for keeping the state in which the hinge unit 4 stands on the X axis.

Figure 4:
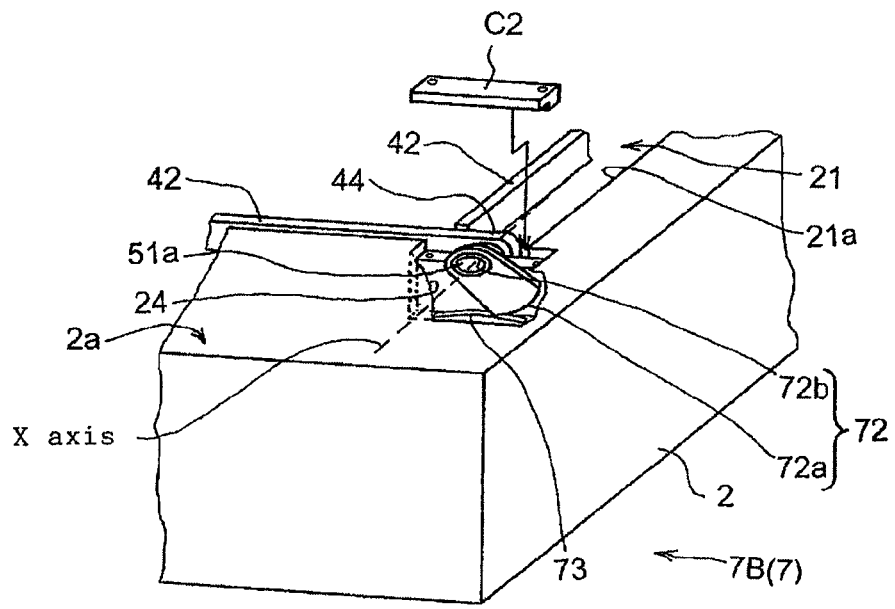
FIG. 4 is a partially-notched perspective view of an end of a shaft part disposed on an X axis.

The first resistance applying mechanism 7B includes, as depicted in FIG. 4, the first cam 72 press-fitting in one end of the lateral-direction shaft part 51a and a first leaf spring 73 pressing the first cam 72.

The first cam 72 includes a convex cam surface 72a abutting on the first leaf spring 73 and a press-fit hole 72b in which the other end of the lateral-direction shaft part 51a fits.

The first leaf spring 73 is accommodated in a spring accommodation groove 24 provided to be recessed in the front surface 2a of the camera main body 2, and is formed substantially in an inverted v shape curved upward. The first leaf spring 73 warps in accordance with the rotation of the first cam 72, and applies a pressing force to the cam surface 72a of the first cam 72 in accordance with the amount of warping. Normally, the spring accommodation groove 24 is covered with a cover C2.

Display rotation inhibiting means 8 against initial rotation of the liquid-crystal display 3 when the liquid-crystal display 3 starts rotating about the Y axis is provided. The display rotation inhibiting means 8 includes a second latch mechanism 8A and a second resistance applying mechanism 8B.

The second latch mechanism 8A is disposed between the liquid-crystal display 3 and the hinge unit 4. The second latch mechanism 8A includes an engaged hole 81 formed in the outer peripheral wall 42 of the hinge unit 4 and a hemispherical engaging protrusion 82 provided to protrude from the outer peripheral surface 3b of the liquid-crystal display 3. The second latch mechanism 8A engages the engaging protrusion 82 in the engaged hole 81 to freely engage and disengage the liquid-crystal display 3 and the hinge unit 4.

While the second latch mechanism 8A is provided to keep the state in which the liquid-crystal display 3 is accommodated in the hinge unit 4 in the present embodiment, the second latch mechanism 8A may be provided as a stopper for keeping the state in which the liquid-crystal display 3 stands on the Y axis.

Figure 5:
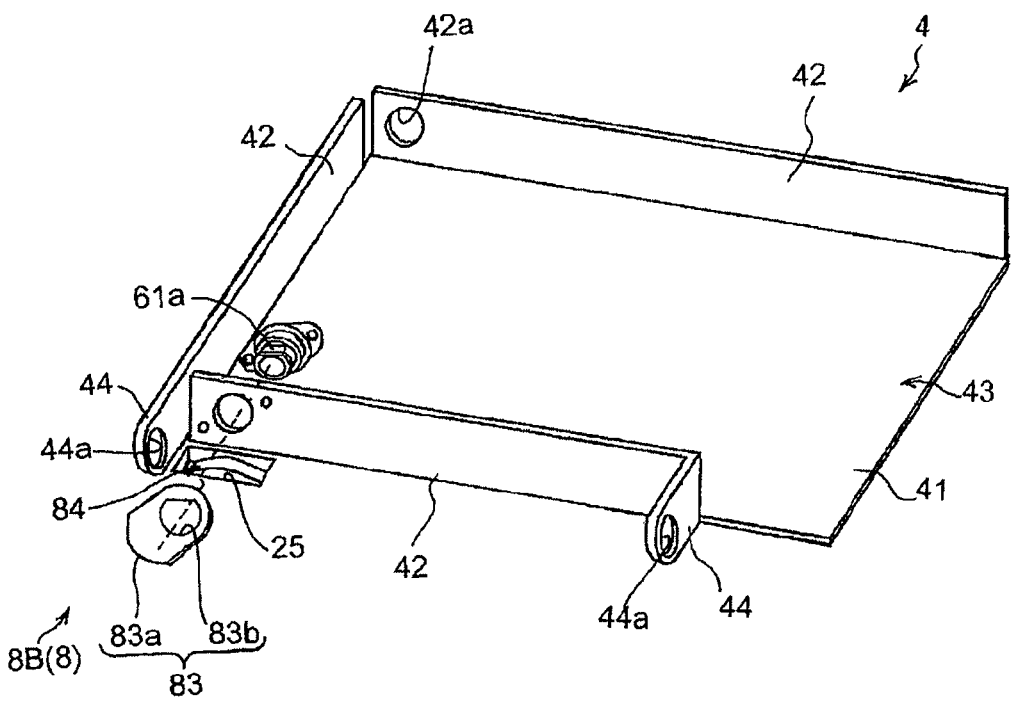
FIG. 5 is a perspective view of the hinge unit, a shaft part disposed on a Y axis, a cam, and a leaf spring.

The second resistance applying mechanism 8B includes, as depicted in FIG. 5, the second cam 83 press-fitting in one end of the longitudinal-direction shaft part 61a and a second leaf spring 84 pressing the second cam 83.

The second cam 83 includes a convex cam surface 83a abutting on the second leaf spring 84.

The second leaf spring 84 is accommodated in a spring accommodation groove 25 provided to be recessed in the front surface 2a of the camera main body 2, and is formed substantially in an inverted v shape curved upward. The second leaf spring 84 warps in accordance with the rotation of the second cam 83, and applies a pressing force to the cam surface 83a of the second cam 83.

Figure 6:
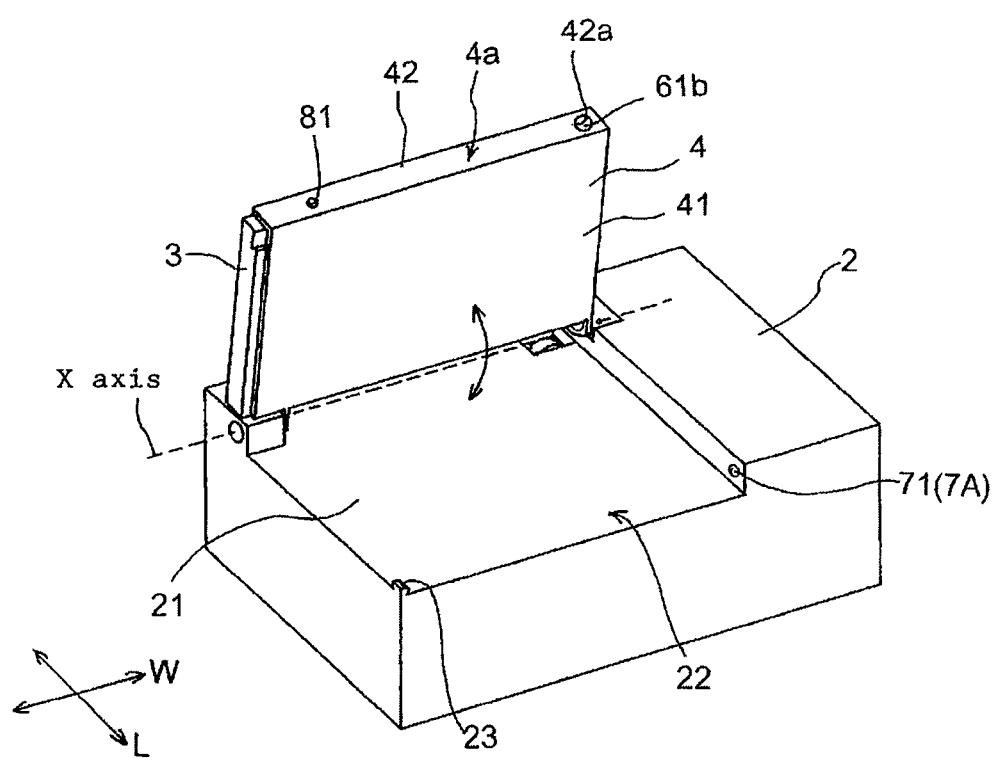
FIG. 6 is a diagram depicting the state in which the electronic display of the digital camera depicted in FIG. 1 is rotated about the X axis.
Figure 7:
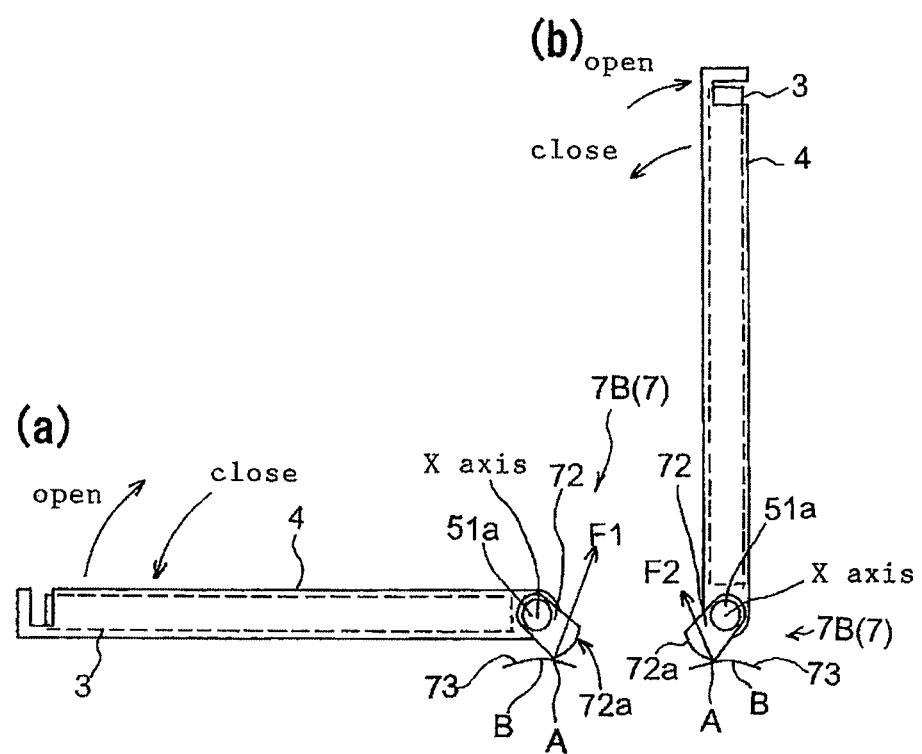
FIG. 7A is a schematic view in which the electronic display is rotated about the X axis, depicting the hinge unit at a closed position and a first resistance applying mechanism.
FIG. 7B is a schematic view in which the electronic display is rotated about the X axis, depicting the hinge unit at a first open position and the first resistance applying mechanism.

Next, the procedure of rotating the liquid-crystal display 3 about the X axis is described based on FIG. 6, FIG. 7A, and FIG. 7B.

First, to open the liquid-crystal display 3 about the X axis, the photographer holds the outer peripheral surface 4a of the hinge unit 4 via the first slit 22 and rotates the hinge unit 4 counterclockwise in FIG. 6. Here, when the hinge unit 4 starts rotating, the hemispherical engaging protrusion is disengaged from the engaged blind hole 71 to release the first latch mechanism 7A. Also, the engagement claw 23 warps outward to be disengaged from the base 41.

As depicted in FIG. 7A, at initial rotation when the hinge unit 4 starts rotating about the X axis to be opened, that is, before a contact point A between the first leaf spring 73 and the cam surface 72a of the first cam 72 passes over an apex B of the first leaf spring 73, the first leaf spring 73 warping in accordance with the rotation of the first cam 72 applies a pressing force F1 to the first cam 72 in a direction in reverse to the rotating direction of the hinge unit 4. Therefore, the photographer has to rotate the hinge unit 4 against the pressing force F1 of the first leaf spring 73. This can inhibit the liquid-crystal display 3 at a closed position from inadvertently opening.

As depicted in FIG. 7B, after the initial rotation, that is, after the contact point A between the first leaf spring 73 and the cam surface 72a of the first cam 72 passes over the apex B of the first leaf spring 73, the first leaf spring 73 warping in accordance with the rotation of the first cam 72 applies a pressing force F2 to the first cam 72 in a direction along the rotating direction of the hinge unit 4. Therefore, the photographer can rotate the hinge unit 4 with a force that is light by the pressing force F2 of the first leaf spring 73. Also, after the initial rotation, to close the hinge unit 4, the photographer has to rotate the hinge unit 4 against the pressing force F2 of the first leaf spring 73. This can inhibit the liquid-crystal display 3 from inadvertently closing.

When the hinge unit 4 rotates about the X axis, the liquid-crystal display 3 and the hinge unit 4 are integrally fixed together by the second latch mechanism 8A.

In this manner, with at least a part of the outer peripheral surface 4a of the hinge unit 4 exposed from the first slit 22, the photographer can easily perform operation of rotating the hinge unit 4 by, for example, holding the hinge unit 4. Therefore, the liquid-crystal display 3 can easily make a transition from the state at the closed position to the state at a first open position, that is, the state in which the liquid-crystal display 3 stands on the X axis perpendicularly to the camera main body 2.

Also, to accommodate the liquid-crystal display 3 at the first open position in the camera main body 2, the hinge unit 4 is rotated about the X axis clockwise in FIG. 6.

As depicted in FIG. 7B, at initial rotation when the hinge unit 4 at the first open position starts rotating about the X axis to be closed, that is, before the contact point A between the first leaf spring 73 and the cam surface 72a of the first cam 72 passes over the apex B of the first leaf spring 73, the first leaf spring 73 warping in accordance with the rotation of the first cam 72 applies the pressing force F2 to the first cam 72 in a direction in reverse to the rotating direction of the hinge unit 4. Therefore, to close the hinge unit 4, the photographer has to rotate the hinge unit 4 against the pressing force of the first leaf spring 73. This can inhibit the liquid-crystal display 3 at the first open position from inadvertently being closed.

After the initial rotation, that is, after the contact point A between the first leaf spring 73 and the cam surface 72a of the first cam 72 passes over the apex B of the first leaf spring 73, the first leaf spring 73 warping in accordance with the rotation of the first cam 72 applies the pressing force F1 to the first cam 72 in the direction along the rotating direction of the hinge unit 4. Therefore, the photographer can rotate the hinge unit 4 with a force that is light by the pressing force F1 of the first leaf spring 73. Also, after the initial rotation, to open the hinge unit 4, the photographer has to rotate the hinge unit 4 against the pressing force F2 of the first leaf spring 73. This can inhibit the liquid-crystal display 3 from inadvertently opening.

When the hinge unit 4 is accommodated in the accommodation recessed part 21, the engaging protrusion of the hinge unit 4 engages in the engaged blind hole 71 to lock the first latch mechanism 7A. Also, the base 41 of the hinge unit 4 is latched to the engagement claw 23 to cause the liquid-crystal display 3 and the hinge unit 4 to be integrally fixed to the camera main body 2.

Figure 8:
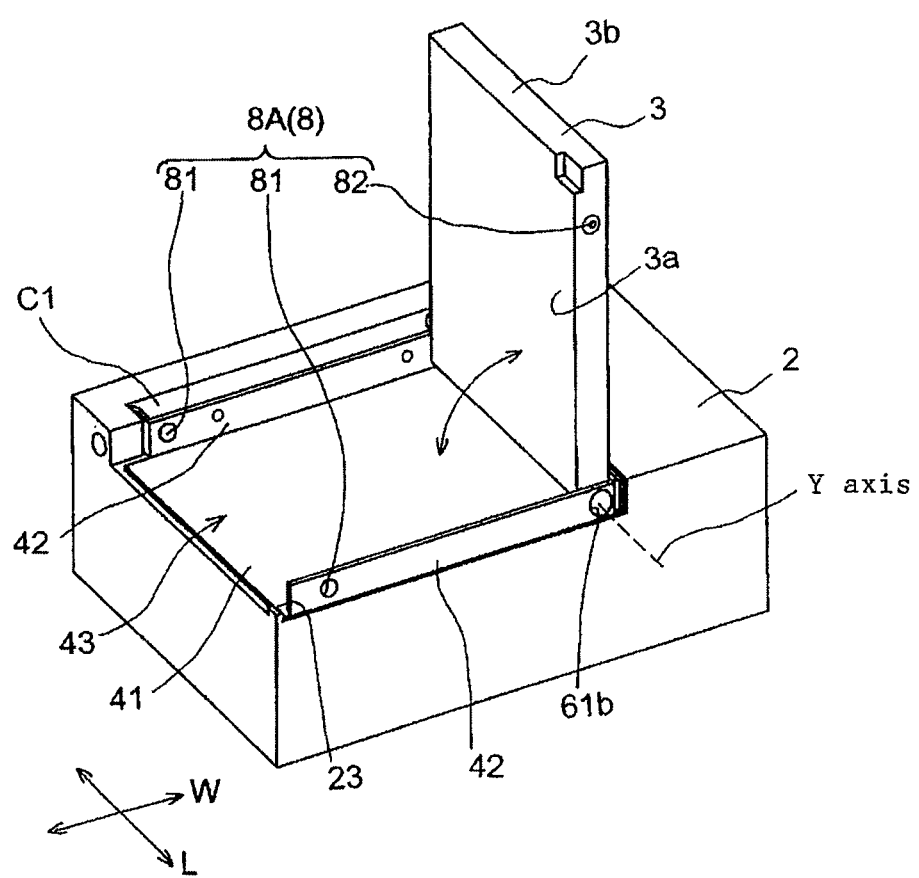
FIG. 8 is a diagram depicting the state in which the electronic display of the digital camera depicted in FIG. 1 is rotated about the Y axis at 90 degrees.
Figure 9:
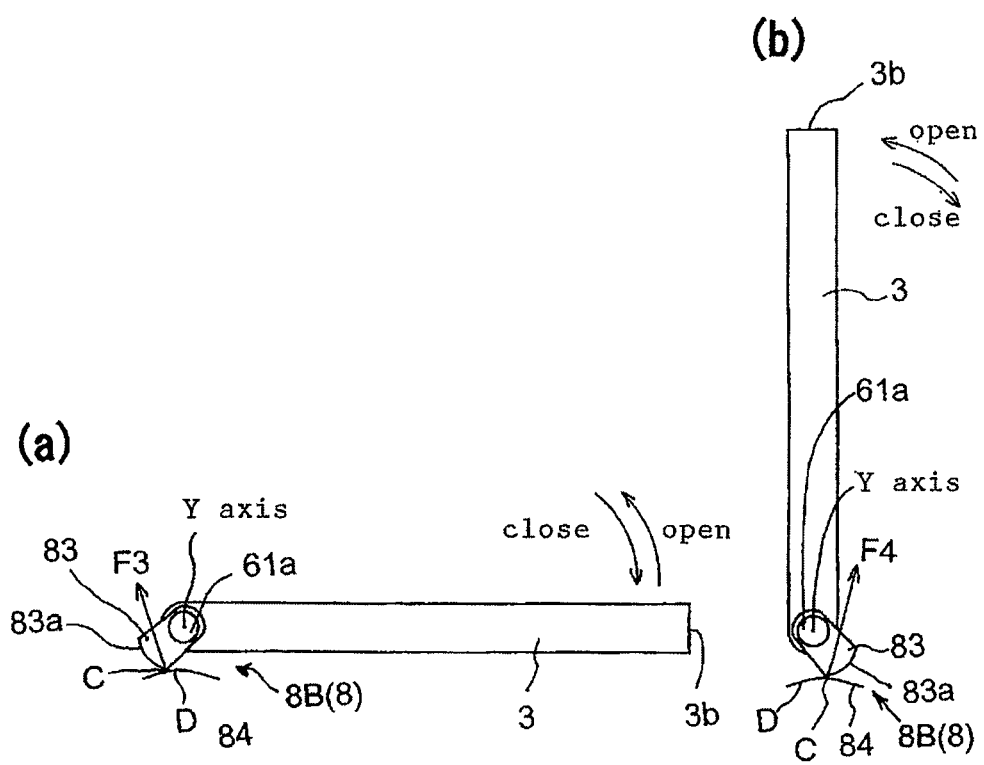
FIG. 9A is a schematic view in which the hinge unit is rotated about the Y axis, depicting the electronic display at a closed position and a second resistance applying mechanism.
FIG. 9B is a schematic view in which the hinge unit is rotated about the Y axis, depicting the electronic display at a second open position and the second resistance applying mechanism.

Next, the procedure of rotating the liquid-crystal display 3 about the Y axis is described based on FIG. 8, FIG. 9A, and FIG. 9B.

First, to rotate the liquid-crystal display 3 about the Y axis, the photographer holds the camera main body 2 via the second slit 43 and rotates the camera main body 2 clockwise in FIG. 8. Here, with the liquid-crystal display 3 being lifted, the hemispherical engaging protrusion 82 provided on the outer peripheral surface 3b of the liquid-crystal display 3 is disengaged from the engaged hole 81 to release the second latch mechanism 8A.

As depicted in FIG. 9A, at initial rotation when the liquid-crystal display 3 starts rotating about the Y axis to be opened, that is, before a contact point C between the second leaf spring 84 and a cam surface 83a of the second cam 83 passes over an apex D of the second leaf spring 84, the second leaf spring 84 warping in accordance with the rotation of the second cam 83 applies a pressing force F3 to the second cam 83 in a direction in reverse to the rotating direction of the liquid-crystal display 3. Therefore, the photographer has to rotate the liquid-crystal display 3 against the pressing force F3 of the second leaf spring 84. This can inhibit the liquid-crystal display 3 at the closed position from inadvertently opening.

As depicted in FIG. 9B, after the initial rotation, that is, after the contact point C between the second leaf spring 84 and the cam surface 83a of the second cam 83 passes over the apex D of the second leaf spring 84, the second leaf spring 84 warping in accordance with the rotation of the second cam 83 applies a pressing force F4 to the second cam 83 in a direction along the rotating direction of the liquid-crystal display 3. Therefore, the photographer can rotate the liquid-crystal display 3 with a force that is light by the pressing force F4 of the second leaf spring 84. Also, after the initial rotation, to close the liquid-crystal display 3, the photographer has to rotate the liquid-crystal display 3 against the pressing force F4 of the second leaf spring 84. This can inhibit the liquid-crystal display 3 from inadvertently closing.

When the liquid-crystal display 3 rotates about the Y axis, the camera main body 2 and the hinge unit 4 are integrally fixed together by the first latch mechanism 7A.

In this manner, with at least a part of the outer peripheral surface 3b of the liquid-crystal display 3 exposed from the second slit 43, the photographer can easily perform operation of rotating the liquid-crystal display 3 by, for example, holding the liquid-crystal display 3. Therefore, the liquid-crystal display 3 can easily make a transition from the state at the closed position to the state at a second open position, that is, the state in which the liquid-crystal display 3 stands on the Y axis perpendicularly to the camera main body 2.

Also, to accommodate the liquid-crystal display 3 at the second open position in the camera main body 2, the liquid-crystal display 3 is rotated about the Y axis clockwise in FIG. 8.

As depicted in FIG. 9B, at initial rotation when the liquid-crystal display 3 at the second open position starts rotating about the Y axis to be closed, the second leaf spring 84 warping in accordance with the rotation of the second cam 83 applies a pressing force to the second cam 83 in a direction in reverse to the rotating direction of the hinge unit 4. Therefore, to close the liquid-crystal display 3, the photographer has to rotate the hinge unit 4 against the pressing force of the second leaf spring 84. This can inhibit the liquid-crystal display 3 at the second open position from inadvertently being closed.

After the initial rotation, that is, after the contact point C between the second leaf spring 84 and the cam surface 83a of the second cam 83 passes over the apex D of the second leaf spring 84, the second leaf spring 84 warping in accordance with the rotation of the second cam 83 applies a pressing force to the second cam 83 in the direction along the rotating direction of the hinge unit 4. Therefore, the photographer can rotate the hinge unit 4 with a force that is light by the pressing force of the second leaf spring 84. Also, after the initial rotation, to open the liquid-crystal display 3, the photographer has to rotate the liquid-crystal display 3 against the pressing force of the second leaf spring 84. This can inhibit the liquid-crystal display 3 from inadvertently opening.

When the liquid-crystal display 3 is accommodated in the hinge unit 4, the hemispherical engaging protrusion 82 provided to the outer perimeter surface 3b of the liquid-crystal display 3 engages in the engaged hole 81 to lock the second latch mechanism 8A. This causes the liquid-crystal display 3 to be integrally fixed to the hinge unit 4 and the camera main body 2.

Figure 10:
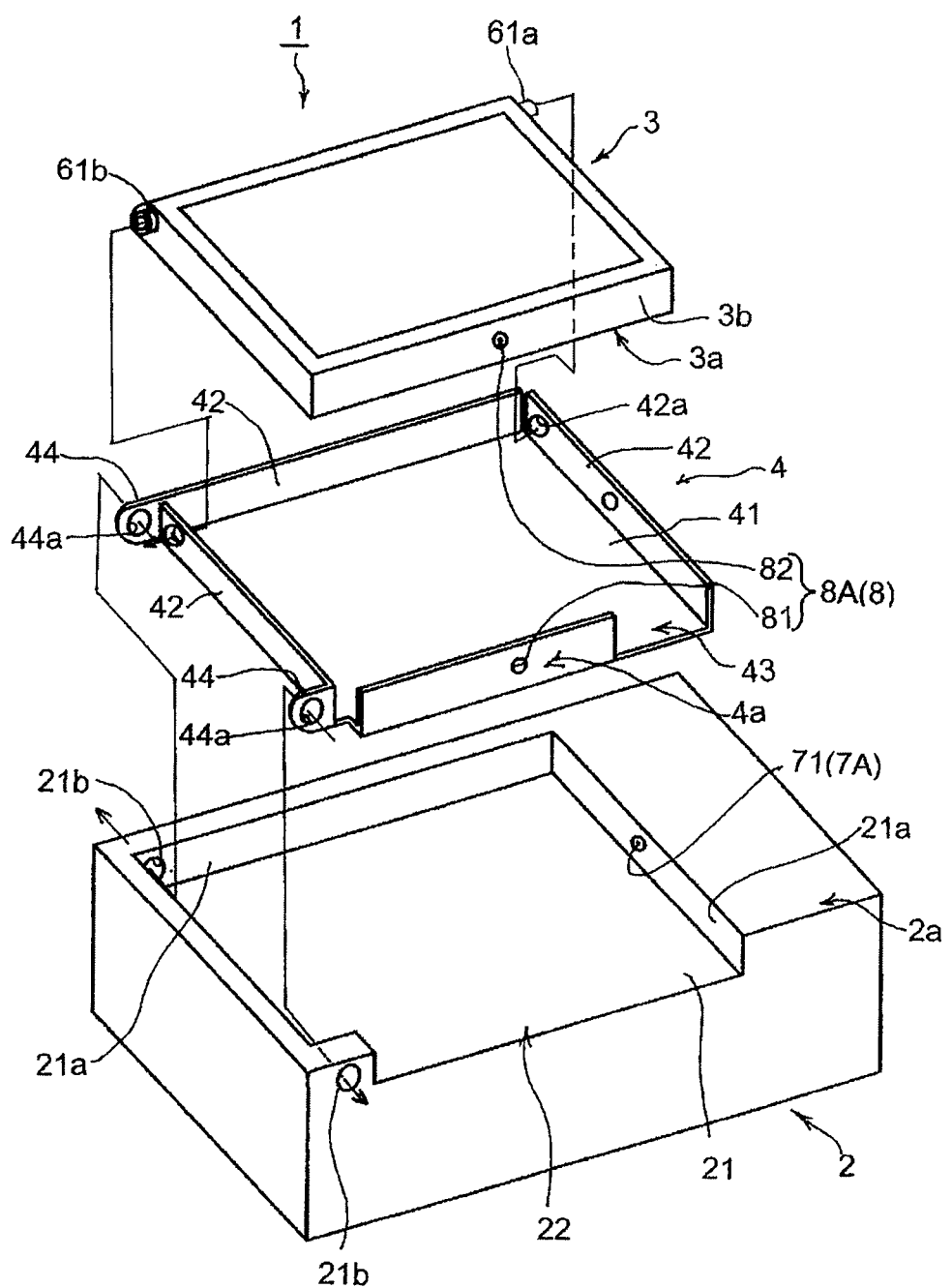
FIG. 10 is an exploded view of a camera main body, an electronic display, and a hinge unit for use in a digital camera according to a modification example of the present invention.

Next, the digital camera 1 according to a modification example of the above-described embodiment is described based on FIG. 10. Here, members identical to those of the above-described embodiment are not described.

The digital camera 1 of the modification example is different from the digital camera 1 according to the above-described embodiment in specific arrangement of the X axis and the Y axis. In the modification example, the X axis is set to be parallel to the camera longitudinal direction L and the Y axis is set to be parallel to the camera lateral direction W.

The first slit 22 exposing the outer peripheral wall 4a of the hinge unit 4 to outside is formed by cutting out the entire inner peripheral wall 21a facing the Y axis among the inner peripheral walls 21a of the accommodation recessed part 21.

The second slit 43 exposing the outer peripheral surface 3b of the liquid-crystal display 3 to outside is formed by cutting out part of the outer peripheral wall 4a facing the Y axis among the outer peripheral walls 4a of the hinge unit 4.

In this manner, in the digital camera 1 according to the present embodiment and the modification example, the photographer can easily perform operation of rotating the hinge unit 4 by, for example, holding the hinge unit 4 via the first slit 22, and the liquid-crystal display 3 can easily make a transition from the closed position to the first open position. Also, the photographer can easily perform operation of rotating the liquid-crystal display 3 by, for example, holding the liquid-crystal display 3 via the second slit 43, and the liquid-crystal display 3 can easily make a transition from the closed position to the second open position. This allows the liquid-crystal display 3 to freely rotate longitudinally and laterally with ease in a simple structure.

While the rotation angle of the liquid-crystal display and the hinge unit is set at 90 degrees in the present invention, the rotation angle is not strictly required to be 90 degrees, and may be, for example, 80 degrees or 100 degrees.

The present invention can be variously modified as long as modifications do not deviate from the spirit of the present invention, and it goes without saying that the present invention also covers such modifications.

What is claimed is:

1. A digital camera comprising:
   a camera main body having an imaging lens, an electronic display for displaying an image taken by the imaging lens, and a hinge unit coupled rotatably about a first rotation shaft to the camera main body and rotatably coupling the electronic display about a second rotation shaft perpendicular to the first rotation shaft,
   wherein the camera main body includes a first slit formed by cutting out at least a part of inner peripheral walls of an accommodation recessed part provided to be recessed in a front surface of the camera main body to accommodate the hinge unit, the first slit exposing an outer peripheral surface of the hinge unit to outside, and
   the hinge unit includes a second slit formed by cutting out at least a part of outer peripheral walls surrounding an outer perimeter of the electronic display, the second slit exposing an outer peripheral surface of the electronic display to outside.

2. The digital camera according to claim 1, wherein the second slit is formed by cutting out at least a part of an outer peripheral wall facing the second rotation shaft among the outer peripheral walls of the hinge unit.

3. The digital camera according to claim 1, wherein the first slit is formed by cutting out at least a part of an inner peripheral wall facing the first rotation shaft among the inner peripheral walls of the camera main body.

4. The digital camera according to claim 1, further comprising
   hinge unit rotation inhibiting means against rotation of the hinge unit at initial rotation when the hinge unit starts rotating about the first rotation shaft.

5. The digital camera according to claim 4, wherein the hinge unit rotation inhibiting means includes a first latch mechanism disposed between the camera main body and the hinge unit to freely engage and disengage the camera main body and the hinge unit.

6. The digital camera according to claim 4, wherein the hinge unit rotation inhibiting means includes a first cam coupled to the first rotation shaft and having a convex cam surface and a first leaf spring which presses the cam surface of the first cam, and includes a first resistance applying mechanism in which, at initial rotation when the hinge unit starts rotating about the first rotation shaft, the first leaf spring applies, to the cam surface of the first cam, a resistance in a direction in reverse to a rotating direction of the hinge unit.

7. The digital camera according to claim 1, further comprising
   display rotation inhibiting means against rotation of the electronic display at initial rotation when the electronic display starts rotating about the second rotation shaft.

8. The digital camera according to claim 7, wherein the display rotation inhibiting means includes a second latch mechanism disposed between the electronic display and the hinge unit to freely engage and disengage the electronic display and the hinge unit.

9. The digital camera according to claim 7, wherein the display rotation inhibiting means includes a second cam coupled to the second rotation shaft and having a convex cam surface and a second leaf spring which presses the cam surface of the second cam, and includes a second resistance applying mechanism in which, at initial rotation when the electronic display starts rotating about the second rotation shaft, the second leaf spring applies, to the cam surface of the second cam, a resistance in a direction in reverse to a rotating direction of the electronic display.

10. The digital camera according to claim 1, wherein the outer peripheral wall of the hinge unit is formed by upwardly folding a peripheral edge of a base of the hinge unit facing a back surface of the electronic display.

* * * * *